United States Patent
Siddiqui et al.

(10) Patent No.: US 6,292,666 B1
(45) Date of Patent: Sep. 18, 2001

(54) SYSTEM AND METHOD FOR DISPLAYING COUNTRY ON MOBILE STATIONS WITHIN SATELLITE SYSTEMS

(75) Inventors: Aqeel Siddiqui; Vladimir Alperovich, both of Dallas, TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/306,701

(22) Filed: May 6, 1999

(51) Int. Cl.$^7$ ........................................ H04Q 7/20
(52) U.S. Cl. ................. 455/456; 455/432; 455/435; 455/457; 455/566; 455/427; 455/12.1
(58) Field of Search ................... 455/456, 457, 455/432, 433, 566, 435, 427, 428, 429, 12.1

(56) References Cited

U.S. PATENT DOCUMENTS

| | | | |
|---|---|---|---|
| 5,802,468 | * | 9/1998 | Gallant et al. ............... 455/422 |
| 5,870,741 | * | 2/1999 | Kawabe et al. ................ 707/7 |
| 6,038,444 | * | 3/2000 | Schipper et al. ............. 455/421 |
| 6,104,931 | * | 8/2000 | Havinis et al. ............... 455/456 |
| 6,112,087 | * | 8/2000 | Tayloe ......................... 455/435 |
| 6,148,176 | * | 11/2000 | Kolev et al. ................ 455/12.1 |

\* cited by examiner

Primary Examiner—Nay Maung
Assistant Examiner—Temica M. Davis
(74) Attorney, Agent, or Firm—Jenkens & Gilchrist, P.C.

(57) ABSTRACT

A telecommunications system and method is disclosed for providing accurate country information to Mobile Stations (MSs) within a satellite network. At the time of location update, the MS sends Global Positioning System (GPS) coordinates identifying the location of the MS to a serving Mobile Switching Center (MSC) via a satellite. The MSC determines the identity of the current country that the MS is located in, and calculates the distance to the nearest country border. The current country identity and distance information are transmitted back to the MS via the satellite. Thereafter, the MS continues to calculate GPS coordinate information, and if the distance between the current location of the MS and the location of the MS at the time of the previous location update becomes equal to or greater than received distance information, a query is done to the MSC to determine the current country where the MS is located. If the country has changed, then the new country is displayed on the MS.

30 Claims, 6 Drawing Sheets

SYSTEM AND METHOD FOR DISPLAYING COUNTRY ON MOBILE STATIONS WITHIN SATELLITE SYSTEMS

BACKGROUND AND OBJECTS OF THE PRESENT INVENTION

Cellular telecommunications is one of the fastest growing and most demanding telecommunications applications. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and a Visitor Location Register (VLR) 16 therein. The MSC/VLR areas 12, in turn, include a plurality of Location Areas (LA) 18, which are defined as that part of a given MSC/VLR area 12 in which a Mobile Station (MS) 20 may move freely without having to send update location information to the MSC/VLR 14/16 that controls the LA 18. Each LA 12 is divided into a number of cells 22. The MS 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS 24 is the physical equipment, illustrated for simplicity as a radio tower, that provides radio coverage to the geographical part of the cell 22 for which it is responsible. It should be understood that the BSC 23 may be connected to several BTS's 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the MS's 20 currently located within the MSC/VLR area 12. If an MS 20 roams into a new MSC/VLR area 12, the VLR 16 connected to that MSC 14 will request data about that MS 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

It should be understood that the aforementioned system 10, illustrated in FIG. 1, is a terrestrially-based system. In addition to the terrestrially-based systems, there are a number of satellite systems, which work together with the terrestrially-based systems to provide cellular telecommunications to a wider network of subscribers. This is due to the fact that the high altitude of the satellite makes the satellite visible (from a radio perspective) from a wider area on the earth. The higher the satellite, the larger the area that the satellite can communicate with.

Within a satellite-based network 10, as shown in FIG. 2 of the drawings, a system of satellites 200 (only one of which is shown) in orbit are used to provide communication between MS's 20 and a satellite-adapted Base Station System (SBSS) 220, which is connected to a Mobile Switching Center 14. The MS 20 communicates via one of the satellites 200 using a radio air interface. The satellite 200 in turn communicates with one or more SBSSs 220, which consist of equipment for communicating with the satellites 200 and through the satellites 200 to the MS's 20. The antennae and satellite tracking part of the system is the Radio Frequency Terminal (RFT) subsystem 230, which also provides for the connection of the communication path to the satellite 200.

In such satellite networks 10, a coverage area 205 for a satellite 200 can be (and usually is) very large. This area 205 can be served by a number of MSCs 14 which are connected to Public Switched Telephone Networks (PSTNs) (wireline networks), PLMNs (cellular networks) and each other. As in a normal GSM system, each MSC 14 may serve a number of different SBSS's 220, each of which are associated with a particular set of satellite cells 250. It should be understood that the coverage area for a satellite cell 250 is much larger than the coverage area for a normal GSM cell 22 (shown in FIG. 1). This is due to the fact that a satellite beam 210 directed at a particular satellite cell 250 can cover more area than a signal transmitted from a BTS 24 (shown in FIG. 1) on earth.

The satellite 200 transmits a different beam 210 to each satellite cell 250. When an MS 20 moves from one satellite cell 250 into a new satellite cell 250, the MS 20 detects this change by the presence of a new satellite beam 210 for that new satellite cell 250. This triggers the MS 20 to perform a location update. During the location update process, the current PLMN 10 is displayed to the mobile subscriber on the MS 20. Therefore, the mobile subscriber knows whether the MS 20 has roamed outside of the home network 10.

However, if a mobile subscriber crosses a boundary between two countries, this information may not be transmitted to the mobile subscriber. In many cases, the boundaries between countries are not obvious, and the PLMN 10 that the MS 20 is registered with may span several countries. Having knowledge of these boundaries may help the mobile subscriber in making originating calls as to which dialing plan is applicable. For example, if a subscriber has just unknowingly roamed from Germany to Holland, and he/she dials a number to a German subscriber in national format, the call will be routed to Holland instead. Thus, in such cases, valuable satellite resources are used, but the call is routed incorrectly.

Even if the country information is transmitted to the MS 20 during the location update process, the MS 20 may not perform the location update until after the border has been crossed and the mobile subscriber has traveled several miles into the other country. This delay in performing location updates may be due to a number of factors, such as cell reselection hysteresis and cell movement in the satellite network.

Currently, when an MS 20 within a satellite PLMN 10 originates a call to a dialed B-number, the MS 20 provides Global Positioning System (GPS) coordinate information to the satellite network (MSC 14). The MSC 14 takes this GPS coordinate information and utilizes a database 15 of GPS coordinates and associated country codes to append the country code in front of the B-number. If the MS 20 had a similar type of database within it, the MS 20 may be able to convert received GPS coordinates into the current country and display the current country to the mobile subscriber. However, the database in the MS 20 would have to be limited, because it would not be possible to cover all potential coordinates and associated countries and store this information in a memory that would fit into an MS 20. In addition, the database within the MS 20 may not produce exactly the same country as the network database 15. As an example, if the MS 20 displays Germany and the mobile subscriber attempts to use the German numbering plan to make a call, while the MSC 14 calculates the MS 20 position to be in Holland, this may result in a failed call setup.

It is, therefore, an object of the present invention to provide accurate country information to mobile subscribers within a satellite network.

SUMMARY OF THE INVENTION

The present invention is directed to telecommunications systems and methods for providing accurate country information to Mobile Stations (MSs) within a satellite network. At the time of location update, the MS sends the GPS coordinates of the location of the MS to a serving Mobile Switching Center (MSC) via a satellite. The MSC determines the identity of the current country that the MS is located in, and calculates the distance to the nearest country border. The current country identity and distance information are transmitted back to the MS via the satellite in the response to the location update. Thereafter, the MS continues to calculate GPS coordinate information, and if the distance between the current location of the MS and the location of the MS at the time of the location update becomes equal to or greater than received distance information, a query is done to the MSC to determine the current country that the MS is located in. If the country has changed, then the new country is displayed on the MS.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
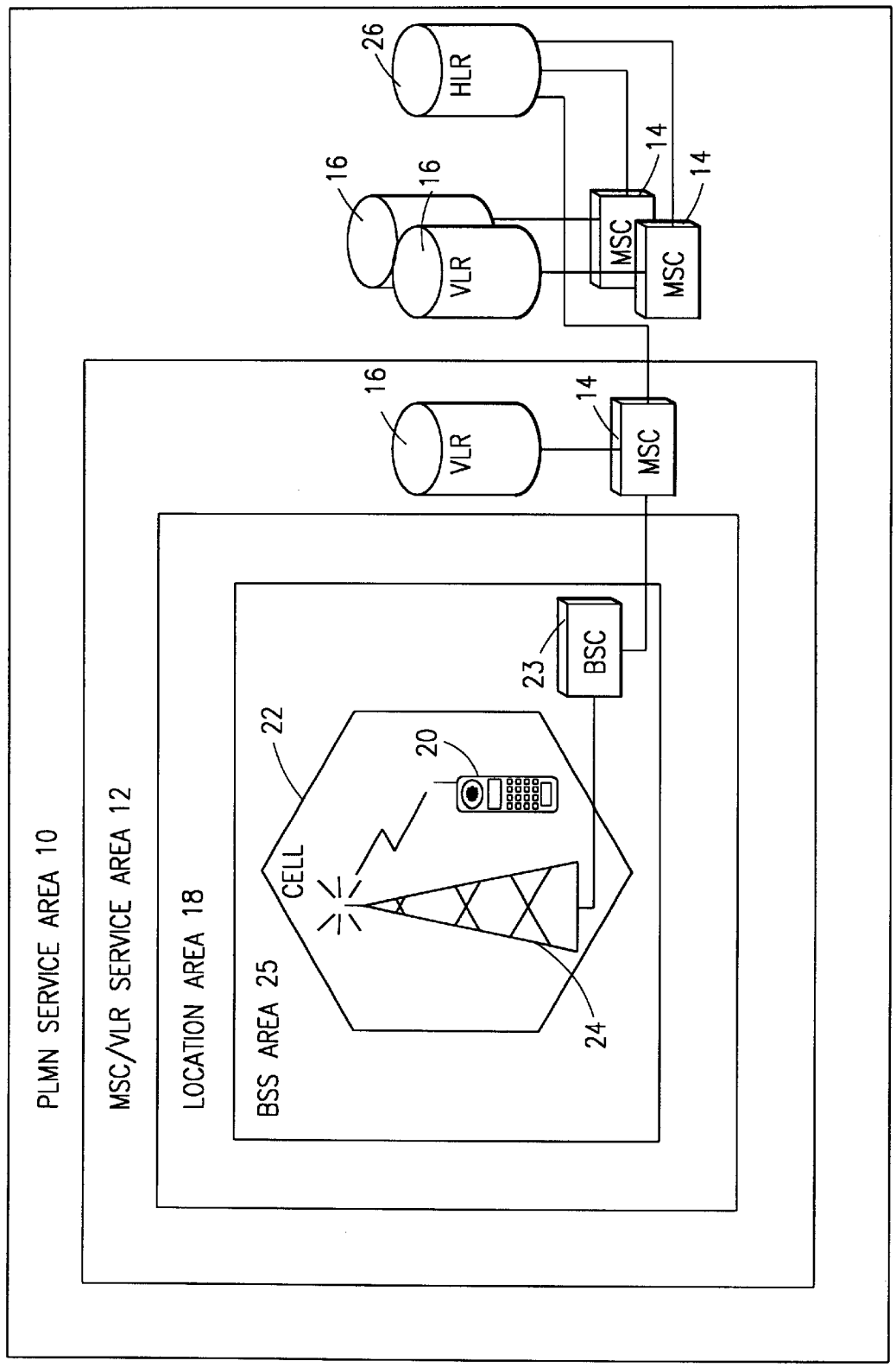
FIG. 1 is a block diagram of a conventional terrestrially-based wireless telecommunications system.
Figure 2:
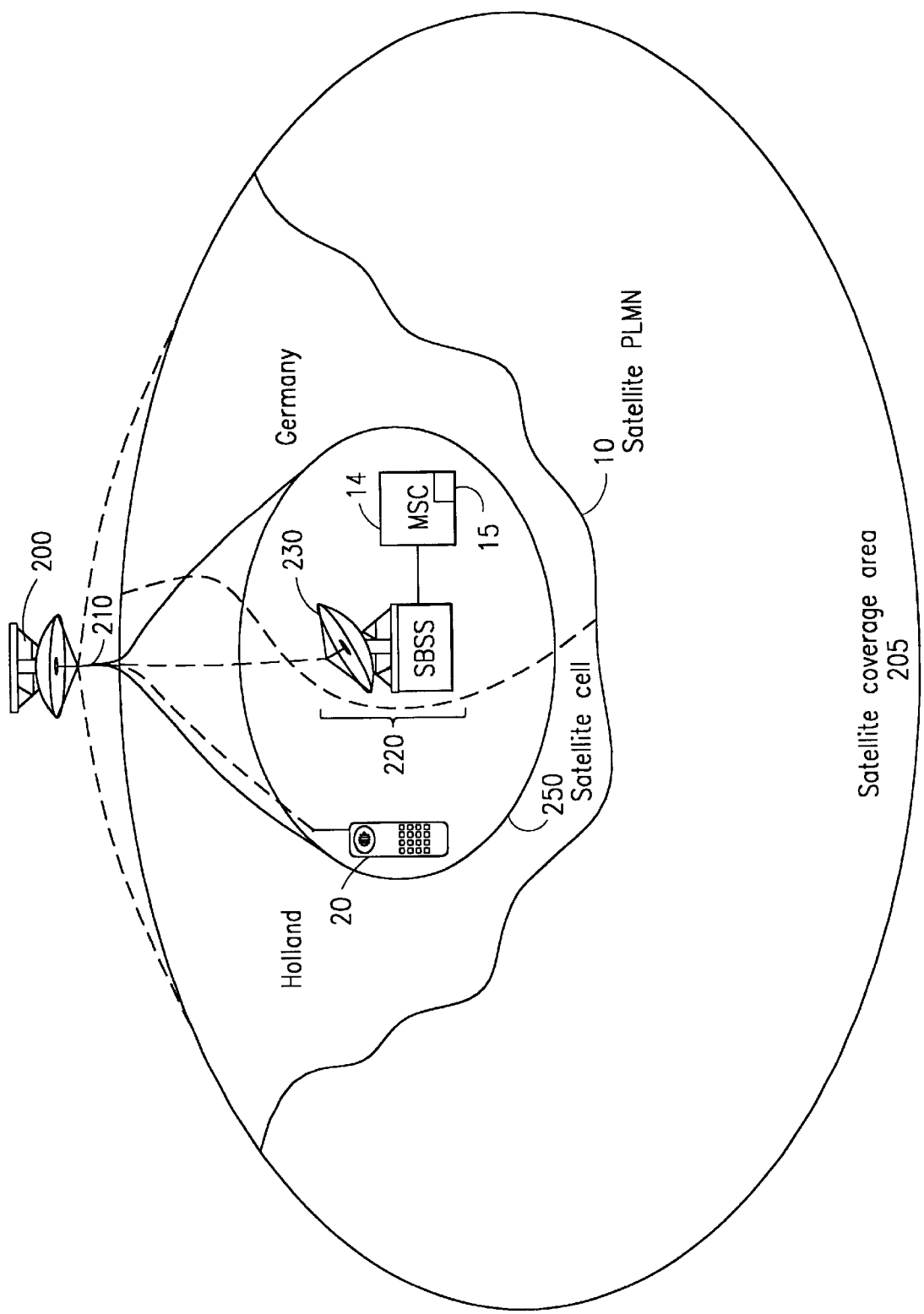
FIG. 2 is a block diagram of a conventional satellite system.
Figure 3:
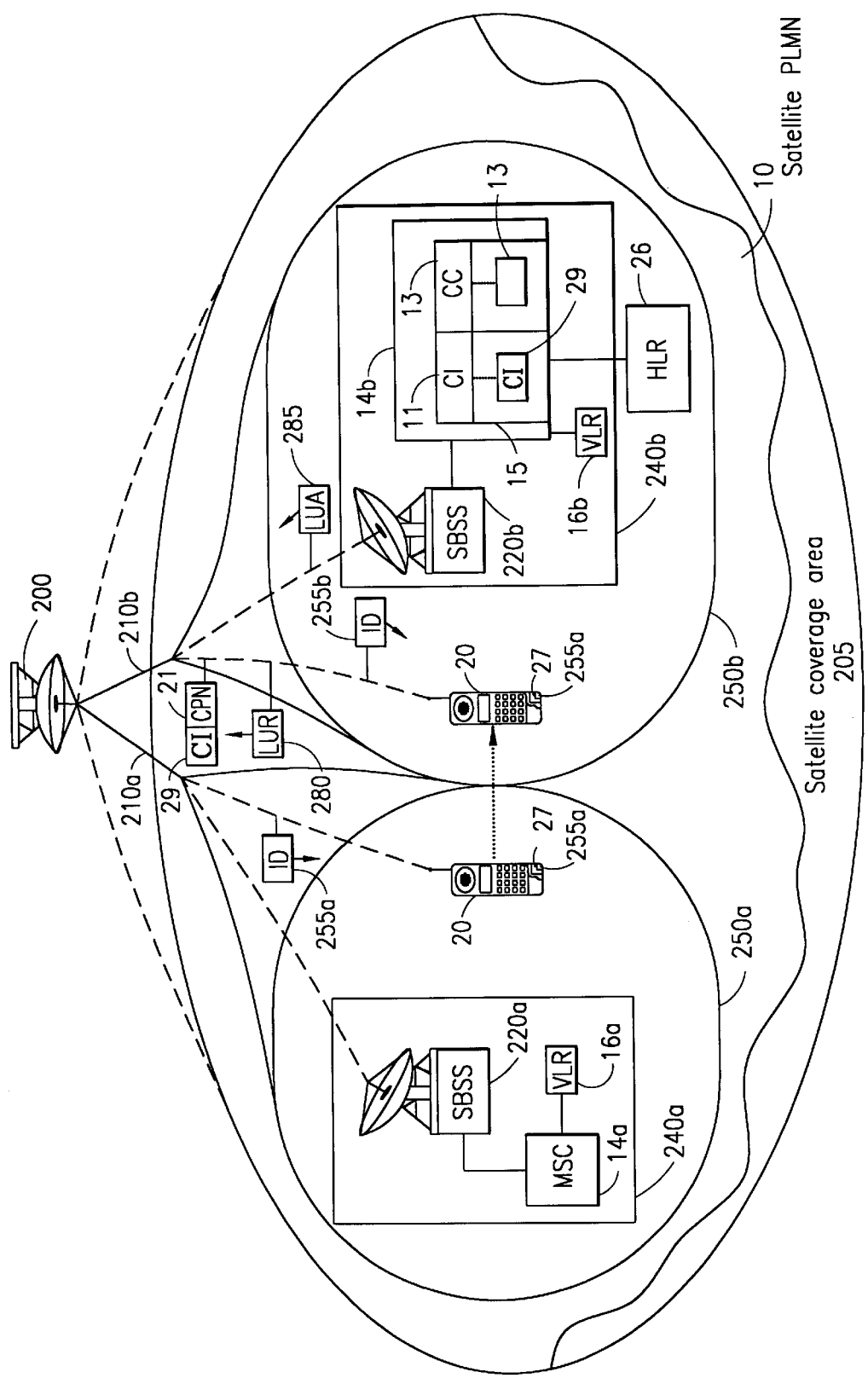
FIG. 3 illustrates a location update process and a call setup process within a satellite system.

With reference now to FIG. 3 of the drawings, within a coverage area 205 of a satellite 200, there are typically a number of different satellite cells 250, only two of which are shown 250a and 250b, each having a particular narrow satellite beam 210a and 210b, respectively associated therewith. The beam 210a and 210b widths can vary to encompass a satellite cell 250 as large as a continent or as small as 20,000 square miles, which is the size of a small state. When a Mobile Station (MS) 20 is within one of these satellite cells 250a, the MS 20 receives an identification 255 of the satellite cell 250 over a broadcast control channel (BCCH) over the satellite beam 210a from the satellite 200, and stores this identification 255a in a memory 27, such as a Subscriber Identity Module (SIM) card, therein. This cell identification information 255a is provided to the MS 20 via the satellite 200 from a ground segment (GS) 240a of a satellite Public Land Mobile Network (PLMN) 10 serving the satellite cell 250a. The GS 240a typically consists of a Satellite-Adapted Base Station System (SBSS) 220a, a Mobile Switching Center 14a and an associated Visitor Location Register (VLR) 16a. It should be understood that the PLMN 10 may have multiple GSs 240, each serving multiple satellite cells 250.

As the MS 20 roams into a new satellite cell 250b, the MS 20 receives signals on the ECCH, and compares the transmitted cell identification 255b with the cell identification 255a stored in the memory 27. If the broadcasted cell identification 255b differs from the cell identification 255a stored in the memory 27, the MS 20 performs a location update procedure to register with the GS 240b serving the new satellite cell 250b. The location update procedure involves the MS 20 sending a Location Updating Request 280 to the GS 240b serving the new satellite cell 250b. If the MSC 14b serving the new satellite cell 250b is different than the MSC 14a serving the previous satellite cell 250a, a Home Location Register (HLR) 26 associated with the MS 20 is updated with the new MSC 14b address. Thereafter, a Location Update Acknowledgment message 285 is sent from the new MSC 14b to the MS 20, and if the PLMN 10 has also changed, the MS 20 is provided with the identification of the new PLMN 10.

Figure 4:
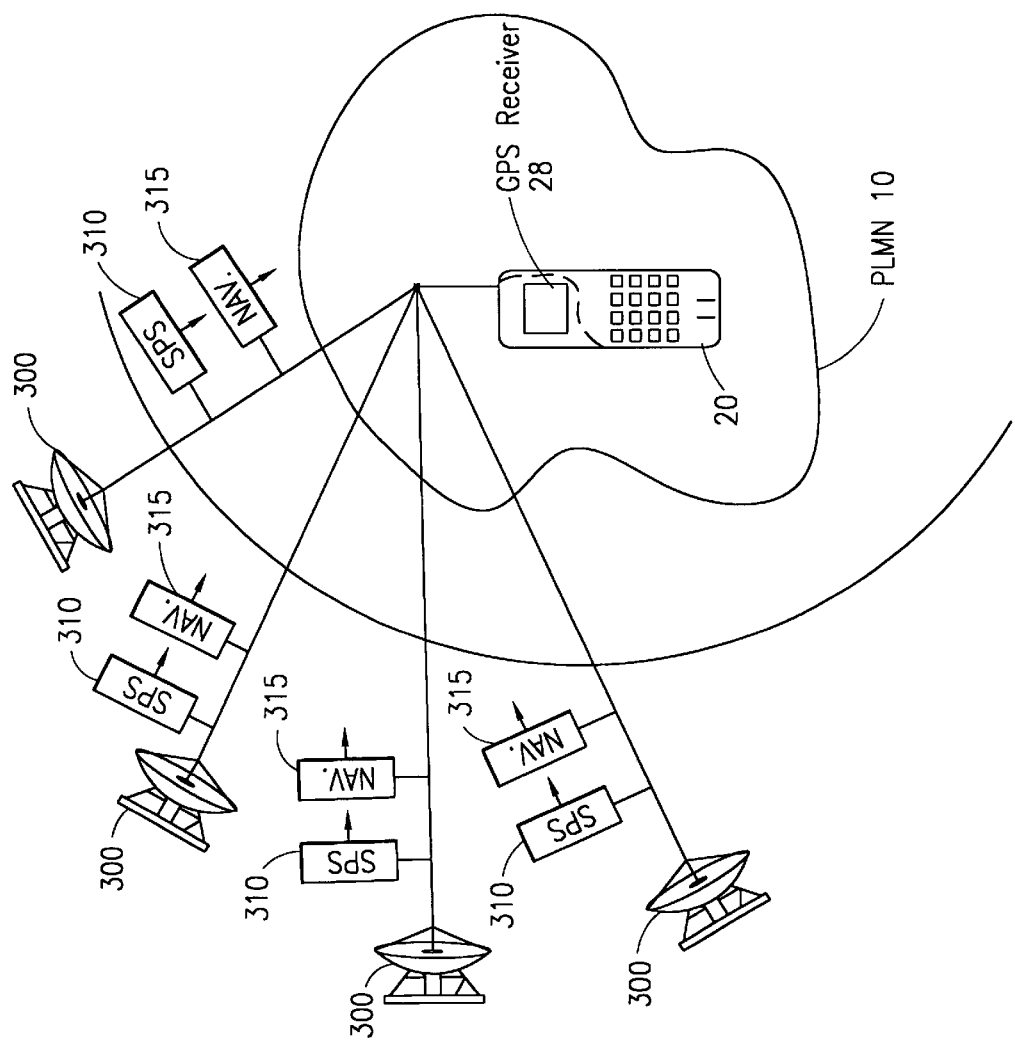
FIG. 4 illustrates a Global Positioning System (GPS) location process.

Once the MS 20 has registered with the GS 240b serving the satellite cell 250b that the MS 20 is located in, the MS 20 can make or receive calls via the satellite 200 and the serving GS 240b. If the MS 20 makes a call, the MS 20 must provide coordinate information 29 pertaining to the exact location of the MS 20 within the satellite network 10 to the GS 240b. With reference now to FIG. 4 of the drawings, the MS 20 can calculate this coordinate information 29 by using a Global Positioning System (GPS) location method. GPS is a well-known technology used by many military and civilian applications. It is based upon a constellation of satellites 300 launched by the U.S. government beginning in 1978. The GPS satellites 300 transmit the standard positioning service (SPS) signal 310, which is available for civilian applications on a 1575.42 MegaHertz carrier. Each satellite 300 uses a unique 1023-chip Gold code at a rate of 1.023 MegaHertz, such that all codes repeat at 1 millisecond intervals.

Each satellite 300 also transmits a unique 50 bit/second navigation message 315 containing parameters that allow GPS receivers 28 on earth to compute a precise position solution. The navigation message 315 includes a precise time reference as well as parameters that precisely describe the orbital positions and clock corrections for the satellites 300.

The MS 20 preferably has one of these GPS receivers 28 located therein. In general, the GPS receiver 28 within the MS 20 computes the GPS coordinates 29 by searching for all visible satellites 300, which can be accomplished by correlating the received signal 310 with replicas of the respective Gold codes, and demodulating the navigation message 315 of each visible satellite 300 to obtain a time reference and orbital position. Thereafter, the GPS receiver 28 computes a range estimate for each visible satellite 300 that includes the GPS receiver clock uncertainty, and, if at least four satellites 300 are visible, computes the GPS receiver 28 position and clock correction using the range estimate.

Referring again to FIG. 3 of the drawings, once the MS 20 has calculated the coordinate information 29, the MS 20 can transmit this calculated coordinate information 29 along with a called party number 21 to the serving GS 240b via the satellite 200. The GS 240b has a coordinate database 15 therein that includes coordinate information 11 (of which the calculated coordinate information 29 is one) and associated country codes 13 for the satellite cell(s) 250b that the GS 240b serves. The coordinate information 29 sent by the MS 20 is used by the GS 240b to append the correct country code 13 in front of the called party number 21 for MS-originated calls. However, as stated earlier, the boundaries between countries may not be obvious to a mobile subscriber. Therefore, if a mobile subscriber wants to call a party that is located in a first country, but the MS 20 associated with the calling mobile subscriber is actually located in a second country, the country code 13 for the second country 270 will be appended to the call, and the call will be routed to the wrong called party. This may result in unwanted and unnecessary charges to the calling mobile subscriber.

Figure 5:
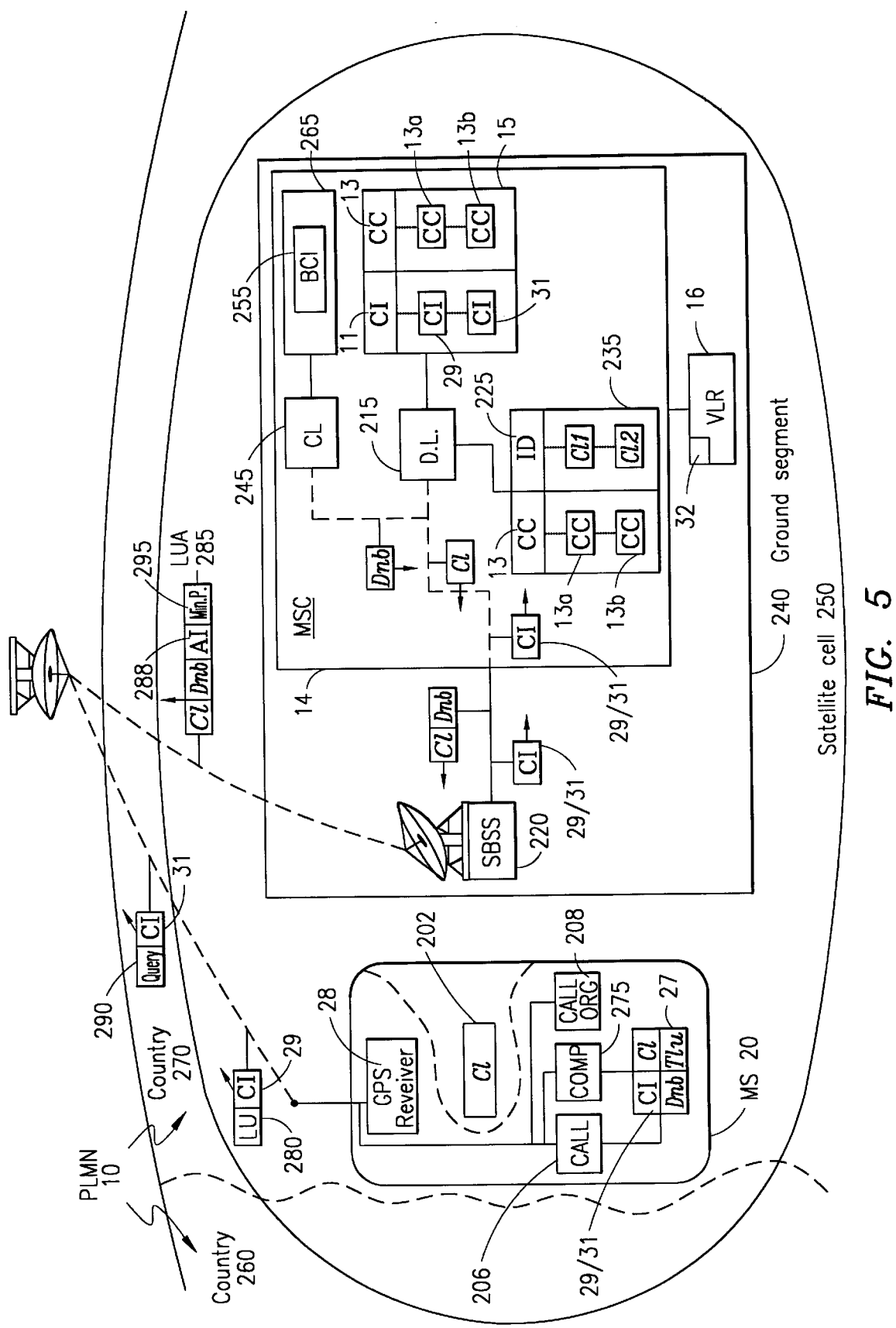
FIG. 5 illustrates a country identification process in accordance with preferred embodiments of the present invention.
Figure 6:
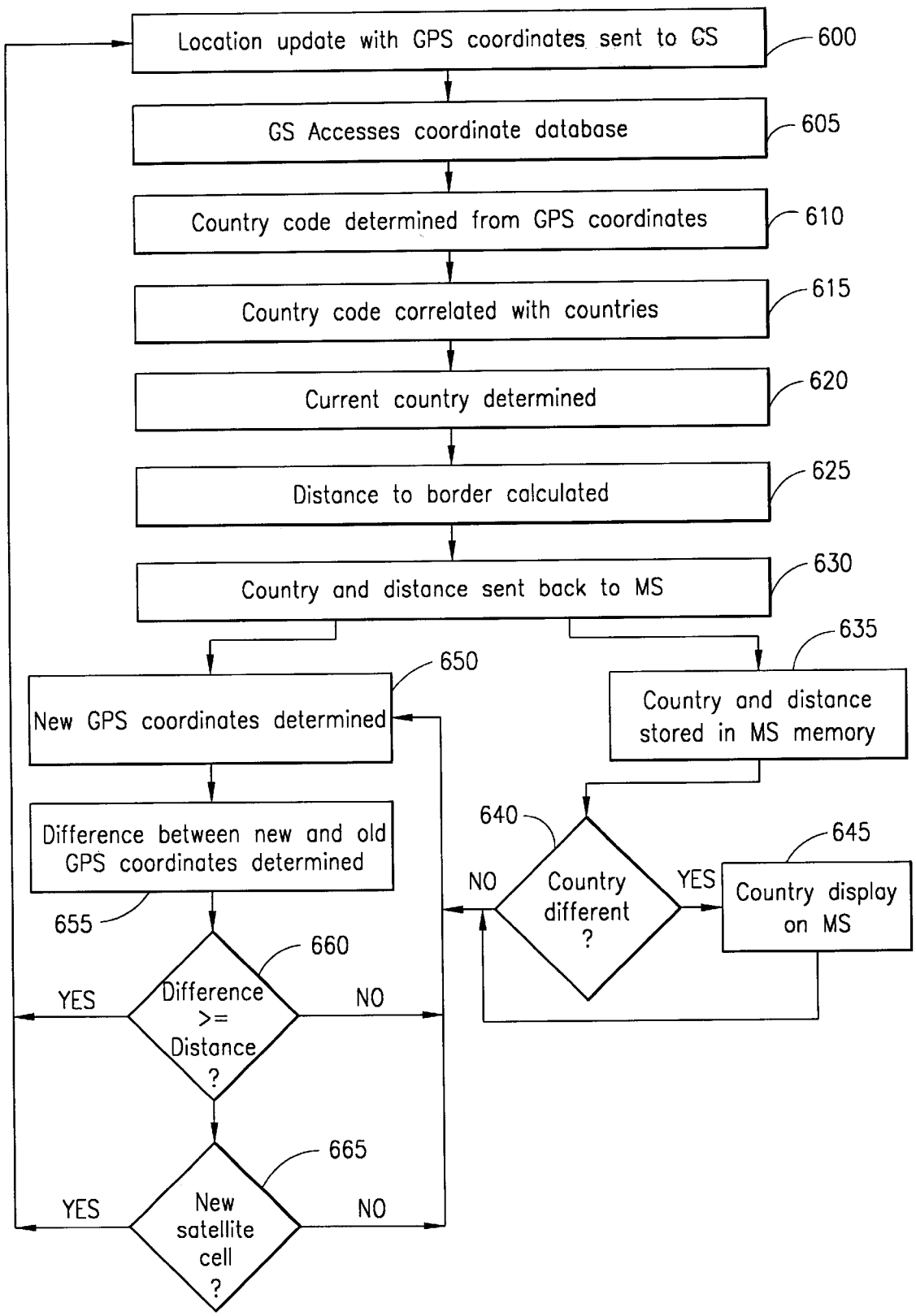
FIG. 6 illustrates the step for identifying the current country where a mobile station is located in accordance with preferred embodiments of the present invention.

Therefore, in accordance with embodiments of the present invention, to prevent incorrect routing of calls, the country that the MS 20 is located in can be displayed on the MS 20 prior to the MS 20 placing a call. With reference now to FIG. 5 of the drawings, which will be described in connection with the steps illustrated in FIG. 6 of the drawings, when the MS 20 performs a location update, for example, at time $Tlu_1$, the MS 20 sends the GPS coordinates 29 of the location of the MS 20 in the Location Updating Message 280 to the GS 240 serving the satellite cell 250 that the MS 20 is located in (step 600).

Based upon the GPS coordinate information 29, the MSC 14 of the GS 240 accesses the coordinate database 15 containing GPS coordination information 11 and associated country code information 13 (step 605), and determination logic 215 within the MSC 14 determines an identity $Cl_1$ of the current country 270 that the MS 20 is located in (step 620). The determination logic 215 determines this identity $Cl_1$ by correlating the received GPS coordinates 29 with the associated country code 13a (step 610), and then correlating this determined country code 13a with country information 225 stored in a country database 235 (step 615).

In addition to determining the country identity $Cl_1$ calculation logic 245 within the MSC 14 also calculates a distance $Dnb_1$ between the MS 20 and a nearest border 262 between the country 270 that the MS 20 is located in and an adjacent country 260 (step 625). This distance $Dnb_1$ is calculated based upon the received GPS coordinate information 29 and border coordinate information 255 stored in a memory 265 in the MSC 14. The identity $Cl_1$ of the current country 270 and distance information $Dnb_1$ is sent back to the MS 20 from the MSC 14 in the Location Update Acknowledgment message 285 (step 630).

Thereafter, the MS 20 store the calculated GPS coordinates 29, the location update time $Tlu_1$, the country identity $Cl_1$, and the distance information $Dnb_1$ in the memory 27 therein (step 635). In addition, if the current country identity $Cl_1$ is different than a previous country identity Cl stored in the memory 27 (step 640), the current country identity $Cl_1$ is displayed on a display 202 of the MS 20 (step 645).

Alternatively, the adjacent country 260 identity may also be included within the Location Update Acknowledgment message 285, and displayed on the display 202. Furthermore, the MSC 14 may access a subscriber record 32 associated with the MS 20, which is stored in the VLR 16, and compare the subscriber record 32 with the border country 260. If a travel advisory exists, e.g., the MS 20 is barred from placing calls in the border country 260, an advisory indication 288 may be transmitted to the MS 20 in the Location Update Acknowledgment message 285, and a warning tone or message may be displayed on the MS 20.

Once the MS 20 receives the identity $Cl_1$ and distance $Dnb_1$ information (step 630), the MS 20 continues to position itself using the GPS receiver 28 therein (step 650). At any time t, calculation logic 206 within the MS 20 calculates the difference between a new location 31 of the MS 20 at time t and the location 29 of the MS 20 at time $Tlu_1$ (step 655). If this difference becomes equal to or greater than the distance information $Dnb_1$ (step 660), a query 290 (a simple query or another location update), including the new location 31, is done to the GS 240 (step 600) to determine the country 260 or 270 that the MS 20 is currently located in at time t (step 620). It should be understood that even if the difference does not equal or exceed the distance information $Dnb_1$, if the MS 20 has entered a new satellite cell 250 (step 665), a new location update message 280, including the new GPS coordinate information 31 is sent to the GS 240 (step 600).

After determining a new identity $Cl_2$ of the current country 260 or 270 (step 620), and calculating new distance information $Dnb_2$, the MSC 14 returns the new identity $Cl_2$ and new distance information $Dnb_2$ back to the MS 20 (step 630). The new location 31, the time $Tlu_2$ of the new location update process, the current country $Cl_2$, and the new distance information $Dnb_2$ are stored in the memory 27 in the MS 20 at this point (step 635). In addition, comparison logic 275 within the MS 20 compares the received country identity $Cl_2$ with the previously stored country identity $Cl_1$, and if the MS 20 has crossed over a border 262 into a new country 260 (step 640), then the identity $Cl_2$ of the new country 260 is displayed on the display of the MS 20 (step 645). In either case, whether the MS 20 has crossed a country border 262 or not, the MS 20 starts tracking the location of the MS 20 (step 645) based upon the new parameters $Cl_2$ and $Dnb_2$.

In some situations, the MS 20 may travel adjacent to a country's border 262 without crossing it, or the MS 20 may cross the country border 262 back and forth multiple times. In these situations, the above solution may produce excessive signaling. To avoid this problem, a minimum period 295, such as a minimum time or a minimum traveling distance, between two queries 290 to the GS 240 can be established by the network operator for the PLMN 10 that the MS 20 is located in. This minimum period 295 can be transmitted to the MS 20 from the MSC 14 along with the current country identity Cl and distance information Dnb in the Location IJpdate Acknowledgment message 285. During this minimum period 295, the MS 20 can display a warning on the display 202, indicating that the mobile subscriber may cross the country's border 262 at any moment. It should be noted that the network operator for the PLMN 10 should set this minimum period 295 optimally so that the warning is displayed for as less time as possible without causing too much signaling.

In addition, during this minimum period 295, the MS 20 can also force the mobile subscriber to make originating calls in international format (using the country code, followed by the B-number of the called party). Call origination logic 208 can present text messages on the display 202 or provide voice messages to the mobile subscriber, informing the mobile subscriber that mobile originated calls must be dialed in international format. When the mobile subscriber dials a called party number, the call origination logic 208 can check to make sure that the called party number is in international format. If not, the call is not accepted, and the text and/or voice messages are provided again to the mobile subscriber.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A satellite telecommunications system for providing the current country that a mobile subscriber is located in to the mobile subscriber, comprising:
   a mobile station within said satellite system for determining a location of said mobile station and displaying a country identity associated with said location; and
   a ground segment for receiving said location from said mobile station via a satellite, determining said country identity based upon said location, calculating a distance between said mobile station and a border between a country associated with said country identity and an adjacent country and transmitting said country identity and said distance to said mobile station via said satellite;
   wherein said mobile station transmits a query to said ground segment to determine a new country identity and a new distance when the difference between said location and a new location determined by said mobile station is greater than said received distance.

2. The satellite system of claim 1, wherein said ground segment comprises:
   a mobile switching center in wireless communication with said mobile station via said satellite; and
   a satellite-adapted base station system in wireless communication with said mobile station via said satellite and connected to said mobile switching center.

3. The satellite system of claim 1, wherein said mobile station includes a Global Positioning System (GPS) receiver for calculating said location, said location comprising GPS coordinates.

4. The satellite system of claim 3, wherein said ground segment has a coordinate database therein containing a plurality of coordinate information and associated country codes.

5. The satellite system of claim 4, wherein said ground segment accesses said coordinate database to correlate said GPS coordinates with a given one of said coordinate information, said country code associated with said given coordinate information being used to determine said country identity.

6. The satellite system of claim 5, wherein said ground segment further includes a country database containing said country codes and associated country information.

7. The satellite system of claim 6, wherein said ground segment accesses said country database to determine said country information associated with said country code associated with said given coordinate information, said determined country information being said country identity.

8. The satellite system of claim 1, wherein said location is sent from said mobile station to said ground segment in a Location Updating message.

9. The satellite system of claim 8, wherein said country identity is transmitted from said ground segment to said mobile station in a Location Update Acknowledgment message.

10. The satellite system of claim 1, wherein said ground segment accesses a subscriber record associated with said mobile station and compares said subscriber record with said adjacent country, said ground segment transmitting a warning indicator along with said distance and country identity to said mobile station when said subscriber record indicates a problem with said adjacent country.

11. The satellite system of claim 1, wherein said mobile station has a memory therein for storing said location, said country identity and said distance.

12. The satellite system of claim 1, wherein said ground segment transmits a minimum period to said mobile station along with said country identity and said distance, said query being transmitted only when said minimum period has been exceeded.

13. The satellite system of claim 12, wherein said mobile station originates a call using a called party number in international format during said minimum period.

14. A method for determining the current country that a mobile station within a satellite telecommunications system is located in, comprising the steps of:
   receiving, by a ground segment in wireless communication with said mobile station via a satellite, a location of said mobile station within said satellite system;
   determining, by said ground segment, a country identity associated with said location;
   calculating, by said ground segment, a distance between said mobile station and a border between a country associated with said country identity and an adjacent country;
   transmitting said country identity and said distance from said ground segment to said mobile station via said satellite; and
   transmitting a query from said mobile station to said ground segment to determine a new country identity and a new distance when the difference between said location and a new location determined by said mobile station is greater than said received distance.

15. The method of claim 14, wherein said step of determining further comprises the steps of:
   accessing a coordinate database within said ground segment, said coordinate database containing a plurality of coordinate information and associated country codes;
   correlating said location with a given one of said coordinate information; and
   determining said country identity using said country code associated with said given coordinate information.

16. The method of claim 15, wherein said step of determining further comprises the steps of:
    accessing a country database within said ground segment, said country database containing said country codes and associated country information; and
    determining said country information associated with said country code associated with said given coordinate information, said determined country information being said country identity.

17. The method of claim 16, wherein said step of receiving further comprises the step of:
    receiving said location from said mobile station in a Location Updating message.

18. The method of claim 14, wherein said step of transmitting further comprises the step of:
    transmitting said country identity from said ground segment to said mobile station in a Location Update Acknowledgment message.

19. The method of claim 14, further comprising the steps of:
    accessing, by said ground segment, a subscriber record associated with said mobile station;
    comparing said subscriber record with said adjacent country; and
    transmitting a warning indicator along with said distance and country identity from said ground segment to said mobile station when said subscriber record indicates a problem with said adjacent country.

20. The method of claim 14, further comprising the step of:
    transmitting a minimum period along with said country identity and said distance from said ground segment to said mobile station.

21. A method for displaying the current country that a mobile station within a satellite telecommunications system is located in, comprising the steps of:
    determining a location of said mobile station within said satellite system by said mobile station;
    transmitting said location from said mobile station to a ground segment in wireless communication with said mobile station via a satellite;
    receiving, by said mobile station, a country identity associated with said location and a distance between said mobile station and a border between a country associated with said country identity and an adjacent country from said ground segment via said satellite;
    displaying said country identity on a display of said mobile stations;
    determining a new location of said mobile station by said mobile station;
    comparing said new location with said received location; and
    if the difference between said received location and said new location is greater than said received distance, transmitting a query from said mobile station to said ground segment to determine a new country identity and a new distance.

22. The method of claim 21, wherein said step of determining further comprises the step of:
    calculating said location using a Global Positioning System (GPS) receiver within said mobile station, said location comprising GPS coordinates.

23. The method of claim 21, wherein said step of transmitting further comprises the step of:
    transmitting said location from said mobile station to said ground segment in a Location Updating message.

24. The method of claim 23, wherein said step of receiving further comprises the step of:
    receiving said country identity from said ground segment in a Location Update Acknowledgment message.

25. The method of claim 21, wherein said step of receiving further comprises the step of:
    receiving a warning indicator along with said distance and country identity from said ground segment when a subscriber record associated with said mobile station indicates a problem with said adjacent country.

26. The method of claim 21, further comprising the step of:
    storing said location, said country identity and said distance in a memory within said mobile station.

27. The method of claim 21, further comprising the steps of:
    receiving said new country identity and said new distance from said ground segment;
    comparing said new country identity with said country identity stored in said memory;
    if said new country identity is different than said country identity stored in said memory, displaying said new country identity on said mobile station; and
    storing said new location, said new country identity and said new distance in said memory.

28. The method of claim 21, wherein said step of receiving said country identity and said distance further comprises the step of:
    receiving a minimum period along with said country identity and said distance from said ground segment.

29. The method of claim 28, wherein said step of transmitting said query further comprises the steps of:
    determining whether said minimum period has been exceeded; and
    if said minimum period has been exceeded, transmitting said query to said ground segment.

30. The method of claim 28, further comprising the steps of:
    determining whether said minimum period has been exceeded; and
    if said minimum period has not been exceeded, originating a call using a called party number in international format,
    otherwise, originating said call using said called party number in national format.

* * * * *

UNITED STATES PATENT AND TRADEMARK OFFICE
CERTIFICATE OF CORRECTION

PATENT NO. : 6,292,666 B1
DATED : September 18, 2001
INVENTOR(S) : Aqeel Siddiqui et al.

Page 1 of 1

It is certified that error appears in the above-identified patent and that said Letters Patent is hereby corrected as shown below:

Column 1,
Line 6, insert Title -- FIELD OF INVENTION --
Line 7, insert -- The present invention relates generally to satellite telecommunications systems, and particularly to placing calls within a satellite telecommunications system based on the location of a calling mobile station. --

Column 3,
Line 59, replace "step" with -- steps --

Column 4,
Line 32, replace "ECCH" with -- BCCH --

Column 6,
Line 5, replace "store" with -- stores --

Column 7,
Line 2, replace "IJpdate" with -- Update --

Column 9,
Line 50, replace "stations" with -- station --

Signed and Sealed this

Thirtieth Day of April, 2002

*Attest:*

*Attesting Officer*

JAMES E. ROGAN
*Director of the United States Patent and Trademark Office*